US008260921B2

(12) United States Patent
Uyama et al.

(10) Patent No.: US 8,260,921 B2
(45) Date of Patent: Sep. 4, 2012

(54) DEMAND FORECASTING SYSTEM FOR DATA CENTER, DEMAND FORECASTING METHOD AND RECORDING MEDIUM WITH A DEMAND FORECASTING PROGRAM RECORDED THEREON

(75) Inventors: Masashi Uyama, Kawasaki (JP); Masatomo Yasaki, Kawasaki (JP); Youji Kohda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1056 days.

(21) Appl. No.: 11/191,989

(22) Filed: Jul. 29, 2005

(65) Prior Publication Data
US 2006/0218278 A1 Sep. 28, 2006

(30) Foreign Application Priority Data

Mar. 24, 2005 (JP) ................................. 2005-086560

(51) Int. Cl.
*G06F 15/173* (2006.01)
(52) U.S. Cl. ........................ 709/226; 705/7.29; 705/7.37
(58) Field of Classification Search ........................ None
See application file for complete search history.

(56) References Cited

U.S. PATENT DOCUMENTS

| 6,393,332 | B1* | 5/2002 | Gleditsch et al. ............... 700/99 |
| 6,487,578 | B2* | 11/2002 | Ranganathan ................ 718/104 |
| 6,957,206 | B2* | 10/2005 | Nolan ............................. 706/47 |
| 6,985,872 | B2* | 1/2006 | Benbassat et al. ............. 705/8 |
| 7,058,704 | B1* | 6/2006 | Mangipudi et al. ........... 709/223 |
| 7,127,625 | B2* | 10/2006 | Farkas et al. ................. 713/320 |
| 7,308,687 | B2* | 12/2007 | Trossman et al. ............ 718/104 |
| 2002/0116234 | A1* | 8/2002 | Nagasawa ..................... 705/5 |
| 2002/0133270 | A1* | 9/2002 | Hung et al. ................... 700/286 |
| 2003/0033184 | A1* | 2/2003 | Benbassat et al. ............ 705/8 |
| 2003/0050917 | A1* | 3/2003 | Charron et al. .............. 707/1 |

(Continued)

FOREIGN PATENT DOCUMENTS

| JP | 2000-285175 | 10/2000 |
| JP | 2001-508259 | 6/2001 |
| JP | 2002-24192 | 1/2002 |

(Continued)

OTHER PUBLICATIONS

Lee, Jihyun (2003). Factors affecting intention to use online financial services. Ph.D. dissertation, The Ohio State University, United States—Ohio.*

(Continued)

*Primary Examiner* — Gurkanwaljit Singh
(74) *Attorney, Agent, or Firm* — Westerman, Hattori, Daniels & Adrian, LLP

(57) ABSTRACT

A demand forecasting system and a demand forecasting method capable of forecasting demands for IT resources in a data center accurately are provided. The demand forecasting system includes: a classification unit that classifies a plurality of users who use IT resources in a data center into a plurality of user's behavior classes; an event characteristics model generation unit that generates an event characteristics model representing a variation over time in a usage state of the IT resources caused by an event and the number of the users moving among the user's behavior classes caused by the event; an event influence calculation unit that calculates a predicted value of the variation over time in a usage state of the IT resources and a predicted value of the number of the users moving among the user's behavior classes that will be caused by an event scheduled to be held in the future using the event characteristics model; and a demand forecasting unit that calculates a variation in load on the IT resources.

7 Claims, 13 Drawing Sheets

U.S. PATENT DOCUMENTS

| | | | |
|---|---|---|---|
| 2003/0069972 A1* | 4/2003 | Yoshimura et al. | 709/226 |
| 2003/0120539 A1* | 6/2003 | Kourim et al. | 705/11 |
| 2003/0149685 A1* | 8/2003 | Trossman et al. | 707/2 |
| 2003/0171977 A1* | 9/2003 | Singh et al. | 705/10 |
| 2005/0055590 A1* | 3/2005 | Farkas et al. | 713/320 |
| 2005/0102398 A1* | 5/2005 | Zhang et al. | 709/225 |
| 2005/0165925 A1* | 7/2005 | Dan et al. | 709/224 |
| 2005/0172291 A1* | 8/2005 | Das et al. | 718/104 |
| 2005/0188075 A1* | 8/2005 | Dias et al. | 709/224 |
| 2005/0198231 A1* | 9/2005 | Gasca et al. | 709/221 |
| 2005/0240668 A1* | 10/2005 | Rolia et al. | 709/223 |
| 2005/0256946 A1* | 11/2005 | Childress et al. | 709/223 |
| 2006/0041466 A1* | 2/2006 | Woehler | 705/10 |
| 2006/0056618 A1* | 3/2006 | Aggarwal et al. | 380/1 |
| 2006/0092851 A1* | 5/2006 | Edlund et al. | 370/252 |

FOREIGN PATENT DOCUMENTS

| | | |
|---|---|---|
| JP | 2002-259672 | 9/2002 |
| JP | 2003-124976 | 4/2003 |
| JP | 2004-258762 A | 9/2004 |
| WO | 98/31114 | 7/1998 |

OTHER PUBLICATIONS

Wendorf, Roli Garg (2005). Channel-change games in spectrum-agile wireless networks. D.P.S. dissertation, Pace University, United States—New York.*

Kouadio, Michel (2002). Accounting architecture and multicast cost allocation in differentiated services networks. Ph.D. dissertation, Texas A&M University, United States—Texas.*

ForecastPro, Apr. 22, 2005, www.forecastpro.com/products/fpfamily/standard.html, pp 1-3.

Naoki Utsunomiya, et al., "Hitachi's Approach for Realizing the Harmonious Computing Concept in the Future", Harmonious Computing, vol. 35 No. 6, pp. 51-54.

Daniel A. Menasce, et al. "A Methodology for Workload Characterization of E-commerce Sites", E-Commerce 99, Denver, Colorado, 1999 ACM 1-58113-176-3/99/0011.

Daniel A. Menasce, et al. "Capacity Planning for Web Services—Metrics, Models, and Methods", Chapter 9, pp. 341-377, Prentice Hall, Upper Saddle River, NJ 07458.

Japanese Office Action dated Jun. 29, 2010, issued in corresponding Japanese Patent Application No. 2005-086560.

Kawamura, R. et al.; "Strategic Network Management Scheme in Multi-service Environment"; NTT R&D, vol. 50, No. 12, The Telecommunications Association, Dec. 10, 2001, pp. 978-984. (English abstract).

Shinagawa, N. et al.; "The Challenges of traffic study in the next generation mobile network"; Management Science Operations Research, vol. 49, No. 8, The Operation Research Society of Japan, Aug. 1, 2004, p. 490-494. (partial translation).

* cited by examiner

FIG.4A

| User | Event 1 | Event 2 | Event 3 | Event 4 |
|---|---|---|---|---|
| ID2343 | 1 | 5 | 2 | 2 |
| ID4345 | 2 | 5 | 4 | 4 |
| ID3242 | 3 | 2 | 5 | 1 |
| ID1112 | 2 | 1 | 1 | 5 |
| ... | | | | |

FIG.4B

| | / | /news | /bbs | /shop |
|---|---|---|---|---|
| ID2343 | 1 | 4 | 1 | 5 |
| ID4345 | 1 | 2 | 3 | 2 |
| ID3242 | 1 | 5 | 5 | 2 |
| ID1112 | 1 | 3 | 2 | 5 |
| ... | | | | |

FIG.4C

| User | Event 1 | Event 2 | Event 3 | Event 4 | / | /news | /bbs | /shop | Class |
|---|---|---|---|---|---|---|---|---|---|
| ID2343 | 1 | 5 | 2 | 2 | 1 | 4 | 1 | 5 | 1 |
| ID4345 | 2 | 5 | 4 | 4 | 1 | 2 | 3 | 2 | 2 |
| ID3242 | 3 | 2 | 5 | 1 | 1 | 5 | 5 | 2 | 3 |
| ID1112 | 2 | 1 | 1 | 5 | 1 | 3 | 2 | 5 | 4 |
| ... | | | | | | | | | |

| User's class 1 | | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | |
| Trend in more recent twelve months (TCI) | 6292 | 5762 | 6142 | 6051 | 6328 | 5905 | 7361 | 6511 | 5592 | 6877 | 4727 | 5340 | |
| Seasonal fluctuation | 1.2 | 1.14 | 0.92 | 0.94 | 0.85 | 0.87 | 0.85 | 0.91 | 0.96 | 1.39 | 1.06 | 1.22 | |

| | Sun. | Mon. | Tue. | Wed. | Thu. | Fri. | Sat. | Holidays |
|---|---|---|---|---|---|---|---|---|
| Weekly fluctuation coefficients | 0.082679 | 1.612383 | 1.486418 | 1.312741 | 1.259975 | 1.029858 | 0.215945 | |

| Fluctuation coefficients per hour | | | | | | | | | | | | | |
|---|---|---|---|---|---|---|---|---|---|---|---|---|---|
| Weekday | 0 a.m. | 1 a.m. | 2 a.m. | 3 a.m. | 4 a.m. | 5 a.m. | 6 a.m. | 7 a.m. | 8 a.m. | 9 a.m. | 10 a.m. | 11 a.m. | |
| | 0.3 | 0.1 | 0 | 0 | 0 | 0 | 0 | 0 | 0.1 | 0.4 | 1.8 | 1.2 | |
| Weekday | 0 p.m. | 1 p.m. | 2 p.m. | 3 p.m. | 4 p.m. | 5 p.m. | 6 p.m. | 7 p.m. | 8 p.m. | 9 p.m. | 10 p.m. | 11 p.m. | |
| | 0.8 | 1.4 | 1.2 | 1 | 0.8 | 0.7 | 0.5 | 0.2 | 0.1 | 0.2 | 0.2 | 0.3 | |
| Holiday | 0 a.m. | 1 a.m. | 2 a.m. | 3 a.m. | 4 a.m. | 5 a.m. | 6 a.m. | 7 a.m. | 8 a.m. | 9 a.m. | 10 a.m. | 11 a.m. | |
| | 1 | 1 | 1 | 1 | 1 | 1 | 1 | 1 | 1 | 1 | 1 | 1 | |
| Holiday | 0 p.m. | 1 p.m. | 2 p.m. | 3 p.m. | 4 p.m. | 5 p.m. | 6 p.m. | 7 p.m. | 8 p.m. | 9 p.m. | 10 p.m. | 11 p.m. | |
| | 1 | 1 | 1 | 1 | 1 | 1 | 1 | 1 | 1 | 1 | 1 | 1 | |

| User ID | Elapsed time (sec.) | User's class |
|---|---|---|
| ID2042 | 130 | 1 |
| ID3531 | 132 | 1 |
| ID1134 | 224 | 3 |
| ID5343 | 261 | 2 |
| ID1943 | 268 | 1 |
| ID2121 | 278 | 1 |
| ID3131 | 280 | 2 |
| ID1132 | 286 | 2 |
| ID2092 | 294 | 2 |
|  |  |  |

FIG.7B

|  | Class 1 | Class 2 | Class 3 | Class 4 |
|---|---|---|---|---|
| 0 to 10 min. | 20% | 10% | 50% | 20% |
| 10 min. To 1 hr | 30% | 20% | 20% | 30% |
| 1 hr to 12 hr | 10% | 50% | 10% | 30% |
| 12 hr to 2 days | 0% | 90% | 10% | 0% |

FIG.7C

| Original class | Class A | Class B | Class C | Class D |
|---|---|---|---|---|
| Class A | * | 0% | 0% | 0% |
| Class B | 5% | * | 1% | 10% |
| Class C | 0% | 0% | * | 0% |
| Class D | 0% | 1% | 0% | * |

| Event type | 6/14 | 6/15 | 6/16 | 6/17 | 6/18 | 6/19 | 6/20 | 6/21 | 6/22 | 6/23 |
|---|---|---|---|---|---|---|---|---|---|---|
| TYPE A | ✓ | | | ✓ | ✓ | ✓ | | | | |
| TYPE B | ✓ | | | | | ✓ | | | | ✓ |
| TYPE C | | ✓ | | | | | | ✓ | | |
| TYPE D | | | ✓ | | | | | | | |

| | |
|---|---|
| Event type | TYPE A |
| Medium | Mailing list (ML) |
| Scheduled reach No. | 5000 people |
| Sending time | 09:00 |
| Target URL | /BBB |
| Intended viewthrough rate | 20% |
| Deadline | None |
| Intended repeating rate | 10% |
| Targeted user | Class 1 |

| Date | Target URL | Collating result | Starting time | Medium | Reach number | Scheduled viewthrough rate | Deadline | Intended repeating rate |
|---|---|---|---|---|---|---|---|---|
| 2004/3/1 | /AAA | Scheduled | 9:00 | ML | 5000 | 50.00% | None | 0% |
| 2004/3/3 | /BBB | No data available | 13:00 | Unidentified | | | | |
| 2004/3/11 | /CCC | Scheduled | 9:00 | ML | 200000 | 0.20% | None | 15% |
| 2004/4/4 | /DDD | Scheduled | 9:00 | TVCM | 20000 | 1.00% | None | 15% |
| 2005/4/11 | /EEE | Scheduled | 9:00 | ML | 5000 | 50% | None | 0% |
| 2004/6/4 | /FFF | No data available | 15:00 | Unidentified | | | | |

DEMAND FORECASTING SYSTEM FOR DATA CENTER, DEMAND FORECASTING METHOD AND RECORDING MEDIUM WITH A DEMAND FORECASTING PROGRAM RECORDED THEREON

BACKGROUND OF THE INVENTION

1. Field of the Invention

The present invention relates to a demand forecasting system that forecasts a demand for IT resources in a data center, a demand forecasting method and a recording medium with a demand forecasting program recorded thereon.

2. Description of Related Art

Information Technology (IT) systems configuring economical and social infrastructures are required to have stability, robustness and cost effectiveness. IT systems have advanced increasingly in recent years, and in order to allow the functions of such IT systems to be kept and follow a change in business environment rapidly while maintaining their stability and robustness, an autonomous processing technology of the system has become essential. The autonomous processing refers to letting the system perform a part of judgment that human has made. For instance, when a load on the system increases or a failure occurs, the autonomous processing allows the IT system to change its configuration autonomously for recovery. Factors behind the increase in load on the system and the failure may include a change in business environment. The autonomous processing technology is for enhancing adaptability of the system so as to follow such a change in business environment.

For instance, in a data center, autonomous control is required for the optimum utilization of IT resources. The data center is a facility for keeping IT resources such as customer's servers, storages and networks therein and for providing circuits for connection with the Internet and maintenance and operation services, for example. Particularly, a data center capable of increasing and decreasing IT resources allocated to each customer in accordance with demands, i.e., in an on-demand manner, is called a utility type data center. In the utility type data center, it is particularly important to forecast a demand for IT resources appropriately and improve a utilization efficiency of the IT resources based on this demand forecasting.

Demands for IT resources may vary not only on a long-term basis such as a seasonal variation, but also with an event of business such as promotions. For instance, after a promotion conducted by the customer company, accesses to the Web server will increase sharply in number and then will decrease gradually.

In order for a data center to satisfy varying requirements for IT resources from a plurality of customers so as to minimize the loss in business chance of the customers and maximize the utilization efficiency of the IT resources in the data center, demand forecasting technologies are required. That is, middle-term variations resulting from a business event such as a promotion as well as long-term variations such as a seasonal variation should be forecasted.

As technologies for forecasting future demands from past usage record, many methods are available, such as a method using multiple regression analysis and a method using autoregressive model such as ARIMA.

Demand forecasting products also are available that enable demand forecasting with consideration given to effects of an event such as a promotion and enable dynamic correction of the forecasting in accordance with actual observation data by changing forecasting models and parameters (e.g., ForecastPRO® produced by Business Forecast Systems, Inc. U.S. (See citation from webpages of ForecastPRO (online) by Business Forecast Systems, Inc. as of Feb. 22, 2005, URL: http://www.forecastpro.com/) (hereinafter called document 1)).

As a known forecasting method directed to the field of marketing, JP2002-259672 A (hereinafter called patent document) discloses a method of classifying behavior patterns of users into a plurality of behavior classes, for example. According to this method, influences of an event on behavior classes of the users are calculated, whereby a variation in demand for each behavior class can be determined, and the entire demand can be forecasted by summing the thus determined variations in demand of the respective behavior classes.

The demand forecasting according to the above document 1 or the patent document, however, is for forecasting a behavior of choice between two alternatives of "buying/not buying". On the other hand, in the demand forecasting in a data center, a continuous load generated from a series of behavior performed by a user after visiting to a website should be forecasted.

Accesses of users to IT services provided by the IT resources in a data center cannot be represented as a single event, but involve a series of spread over time and a variation in load. For instance, in the case of a user who accesses to a site for purchasing merchandise, the user visits to a website and refers to some pages for procedures of purchasing so as to achieve the final purpose of purchasing merchandise or the like. During this process, a continuous load occurs on the IT resources. The behavior by a user after he/she visits the site varies with his/her purpose. Different behavior patterns by users at the site would result in different loads generated. For instance, some users visit the site only for browsing, and other users perform downloading while browsing. In such a case, a load on the resources will be larger in the latter case.

For that reason, the load in the data center cannot be forecasted accurately with simple forecasting of the number of accesses. That is to say, even when the forecasting methods of document 1 and the patent document are applied to the usage forecasting of a website, the number of visiting a top page thereof can be forecasted simply, and a load on a server group by each user's behavior cannot be forecasted.

In this way, already-existing demand forecasting technologies are for forecasting a demand as a single event, and no consideration is given to behavior patterns of users after visiting the site. Therefore, a load cannot be forecasted accurately, thus resulting in a failure of appropriate placement planning of IT resources.

Another demand forecasting technology is disclosed in Naoki UTSUNOMIYA, Nobutoshi SAGAWA, Toshiaki TARUI and Hiroyuki KUMAZAKI, "Hitachi's Approach for Realizing the Harmonious Computing Concept in the Future", the HITACHI HYORON, the June issue in 2004 published on Jun. 1, 2004, pp 51-54, for example (hereinafter called document 2). In this document 2, regarding a ticket sales service, a time period of the occurrence of an event and a variation in amount of demands for services are directly associated with each other for carrying out middle and long-term forecasting. However, even in the forecasting method described in document 2, accesses to IT services by users are handled as a single event. That is, a series of behavior by a user after visiting the website is not considered, and a rough estimate such as 8 times a usual one is carried out simply during an event.

Meanwhile, a method of keeping track as to how a user moves among webpages is proposed using a log of a website so as to calculate a moving probability among pages and classifying users based on such probability (for example, see Daniel A Menascé et al. "A Methodology for Workload Characterization of E-Commerce Site", ACM E-COMMERCE 99, U.S. ACM, 1999, pp 119-128 (Hereinafter called document 3)). Further, a method of simulating a load on a server using the access number based on Queuing Network is proposed (for example, see Daniel A. Menascé, Virgilio A. F. Almeida "Capacity Planning for Web Services", U.S. Prentice Hall, 2002 (hereinafter called document 4)). Apparently it may be considered foreseeable as to how much load is generated by a variation in demand due to an event by combining the techniques described documents 3 and 4 with the technique of the patent document. That is, it may be considered foreseeable as to how much load is generated due to an event as follows: (1) classifying users into a plurality of classes based on user's behavior by the technique described in document 3 or the patent document; (2) forecasting the access number for each class during the occurrence of the event by the technique described in the patent document; and (3) simulating a load on a server using the forecasted access number by the method described in document 4.

However, the classification of user's behavior by document 3 is for modeling a user's page moving pattern after the user visits a site firstly. And this model does not include a distribution tendency of users including some users accessing immediately after the event and other users gathering later after the spread of information by word of mouth, for example. Therefore, this technique cannot forecast how many days it will take from the occurrence of the event to the peak.

Further, according to the classification model described in document 3, users are classified into "occasional users", "heavy users" and the like. However, no consideration is given to the moving among classes by users. Therefore, although many business events have the purpose of getting users to be regular users after the promotion time period, the classification model described in document 3 cannot forecast an increase in load after the users become regular users.

In this way, even with the combination of already-existing demand forecasting technologies, it becomes difficult to forecast a load accurately. That is, since a variation in load due to a promotion or the like cannot be forecasted accurately, it is difficult to estimate necessary IT resources beforehand. For that reason, it is difficult to understand a relationship between profits and investment in IT resources and a relationship between the scale of an event performed and investment in IT resources also. Moreover, it is impossible to make a resource augmentation plan and a promotion plan appropriately.

SUMMARY OF THE INVENTION

Therefore, with the foregoing in mind, it is an object of the present invention to provide a demand forecasting system capable of forecasting demands for IT resources in a data center accurately and to provide a demand forecasting method and a recording medium with a demand forecasting program recorded thereon.

In order to fulfill the above-stated object, a demand forecasting system of the present invention includes: a classification unit that classifies a plurality of users who use IT resources in a data center into a plurality of user's behavior classes based on behavior patterns of the users to use the IT resources; an event characteristics model generation unit that generates an event characteristics model based on a record of usage by the users in the past, the event characteristics model representing a variation over time in a usage state of the IT resources caused by a past event for each user's behavior class and the number of the users moving among the user's behavior classes caused by the event; an event influence calculation unit that calculates a predicted value of the variation over time in a usage state of the IT resources for each user's behavior class and a predicted value of the number of the users moving among the user's behavior classes that will be caused by an event scheduled to be held in the future using the event characteristics model; and a demand forecasting unit that calculates a variation in load on the IT resources based on the predicted values of the variation over time and the number of the users moving that are calculated by the event influence calculation unit.

Since the event characteristics model generation unit generates, based on a past usage record, an event characteristics model representing a variation over time in a usage state of the IT resources for each user's behavior class classified by the classification unit, the event characteristics model can be obtained in which reactions to the event by the plurality of users who may show different behavior patterns are reflected.

Since the event characteristics model generation unit generates an event characteristics model representing the number of the users moving the classes caused by the event, the event characteristics model can be obtained in which a variation in behavior patterns by the users can be reflected. As an example of the variation in behavior patterns of the users, a user occasionally using the IT resources may turn into a heavy user using them frequently because of an event.

Using the above event characteristics model, the event influence calculation unit calculates a predicted value of the variation over time in a usage state of the IT resources for each user's behavior class and a predicted value of the number of the users moving among the user's behavior classes that will be caused by an event scheduled to be held in the future.

Based on these variation over time and the number of the users moving, the demand forecasting unit calculates a variation in load on the IT resources. Therefore, in the thus calculated variation in load, the behaviors by the plurality of users showing different reactions to the event and the behaviors by the users that are changed by the event are taken into consideration, and the variation in load can be one closer to the actual phenomenon. That is, demands for the IT resources in a data center can be forecasted more accurately.

A demand forecasting method of the present invention is for forecasting demands for IT resources in a data center using a computer that is accessible to usage recording data on which usage of the IT resources by a plurality of users is recorded. The method includes the steps of a classification step in which a classification unit included in the computer classifies, based on the usage recording data, the plurality of users who use the IT resources in the data center into a plurality of user's behavior classes according to behavior patterns of the users to use the IT resources; an event characteristics model generation step in which an event characteristics model generation unit included in the computer generates, based on the usage recording data, an event characteristics model representing a variation over time in a usage state of the IT resources caused by a past event for each user's behavior class and the number of the users moving among the user's behavior classes caused by the event; an event influence calculation step in which an event influence calculation unit included in the computer calculates a predicted value of the variation over time in a usage state of the IT resources for each user's behavior class and a predicted value of the number of the users moving among the user's behavior classes that will be caused by an event scheduled to be held in the future using the event characteristics model; and a demand forecasting step in which a demand forecasting unit included in the computer calculates a variation in load on the IT resources based on the predicted values of the variation over time and the number of the users moving that are calculated at the event influence calculation step.

A recording medium of the present invention is a computer readable recording medium having stored thereon a demand forecasting program executable to perform the processes of: a classification process that classifies a plurality of users who use IT resources in a data center into a plurality of user's behavior classes based on behavior patterns of the users to use the IT resources; an event characteristics model generation process that generates an event characteristics model based on a record of usage by the users in the past, the event characteristics model representing a variation over time in a usage state of the IT resources caused by a past event for each user's behavior class and the number of the users moving among the user's behavior classes caused by the event; an event influence calculation process that calculates a predicted value of the variation over time in usage of the IT resources for each user's behavior class and a predicted value of the number of the users moving among the user's behavior classes that will be caused by an event scheduled to be held in the future using the event characteristics model; and a demand forecasting process that calculates a variation in load on the IT resources based on the predicted values of the variation over time and the number of the users moving that are calculated by the event influence calculation process.

According to the present invention, a demand forecasting system, a demand forecasting method and a recording medium with a demand forecasting program recorded thereon can be provided, by which demands for IT resources in a data center can be forecasted accurately.

BRIEF DESCRIPTION OF THE DRAWINGS

FIG. 4A shows an example of the matrix that stores associated "users, events and response time levels", FIG. 4B shows an example of the matrix that stores associated "users, observation point URLs and usage frequency levels", and FIG. 4C shows a synthesized matrix of the matrixes shown in FIG. 4A and FIG. 4B with classes assigned thereto by clustering.

FIG. 5 shows an example of regular variation trends that are stored in a user behavior model.

FIG. 7A shows an example of intermediate data in which elapsed times from the occurrence of the event to accesses by the respective users and user's behavior classes of the respective users are associated with each other, FIG. 7B shows an example of the matrix representing a user's behavior class distribution ratio concerning the access number during certain time periods after the occurrence of an event, FIG. 7C shows an example of data showing a change before and after the event in the number of users belonging to the respective user's behavior classes.

FIG. 8 shows an example of a screen on which a business provider can set event scheduled data.

FIG. 9 shows an example of an event characteristics list.

DETAILED DESCRIPTION OF THE INVENTION

Figure 1:
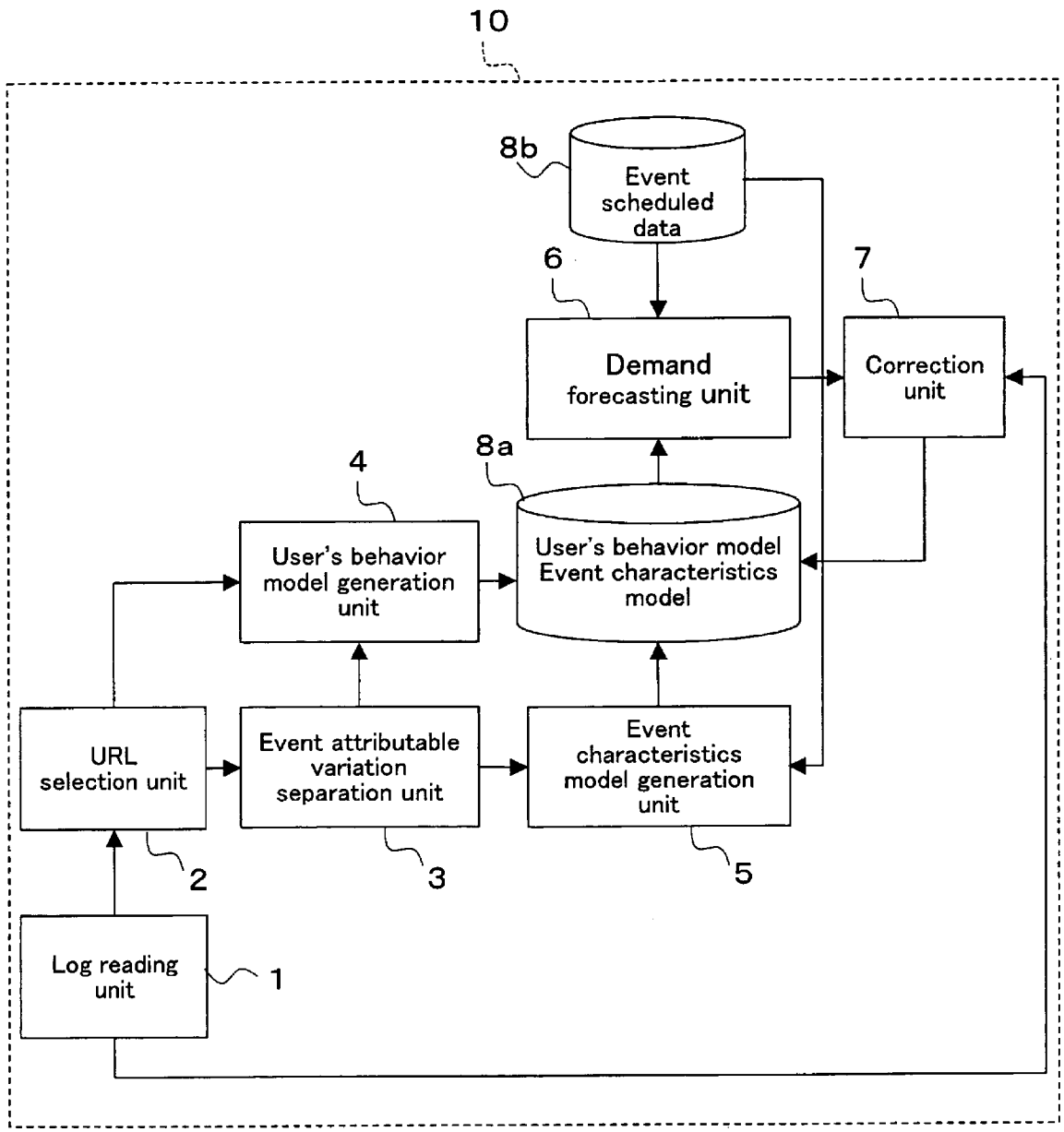
FIG. 1 shows a configuration of a functional module in a demand forecasting system.

In the demand forecasting system of the present invention, it is preferable that the classification unit classifies the users into the plurality of user's behavior classes based on the behavior patterns of the users represented with a time between occurrence of the event and starting of usage of the IT resources by the users and frequencies of the users using the IT resources.

Since the classification unit classifies the users into the plurality of user's behavior classes based on the behavior patterns represented with a time between occurrence of the event and starting of usage of the IT resources by the users and frequencies of the users using the IT resources, classification can be conducted with consideration given not only to the usage frequencies but also to the reactions to the event. Therefore, a distribution tendency of user groups having different response speeds to the event can be obtained, such as a user group reacting to events soon and a user group reacting after confirming others' trends by word of mouth or the like. As a result, the forecasting can be conducted with a consideration given to behaviors of a plurality of users showing different reactions to the event.

Preferably, the demand forecasting system of the present invention further includes a regular variation calculation unit that calculates a regular variation in a usage state of the IT resources for each user's behavior class except for event attributable variations. Preferably, the demand forecasting unit calculates the variation in load based on the variation calculated by the regular variation calculation unit and the predicted values of the variation over time and the number of the users moving calculated by the event influence calculation unit.

Since the demand forecasting unit calculates the variation in load based on the variation calculated by the regular variation calculation unit and the predicted values of the variation over time and the number of the users moving calculated by the event influence calculation unit, a variation in load closer to the actual phenomenon can be obtained. Therefore, demands for IT resources in a data center can be forecasted more accurately.

In the demand forecasting system of the present invention, it is preferable that the event characteristics model generation unit generates a plurality of event characteristics models. Preferably, the event influence calculation unit calculates the predicted values of the variation over time and the number of the users moving using one of the plurality of event characteristics models, and the demand forecasting system further includes a correction unit that collates an initial usage record after the occurrence of the scheduled event with the plurality of event characteristics models and corrects the predicted values of the variation over time and the number of the users moving calculated by the event influence calculation unit using an event characteristics model that is judged by the collating to have the closest resemblance to the usage record.

After the occurrence of the scheduled event, the correction unit collates an initial usage record after the occurrence of the scheduled event with the plurality of event characteristics models so as to extract an event model having the closest resemblance to the usage record. Then using the event characteristics model having the closest resemblance to the usage record, the collection unit corrects the predicted values of the variation over time and the number of the users moving, and therefore more accurate demand forecasting can be conducted so as to correspond to the actual phenomenon. Thereby, even in the case where the usage state immediately after the occurrence of the event is different from the forecasting, the forecasting can be corrected.

In the above demand forecasting system, preferably, the demand forecasting unit calculates a variation in load on the IT resources for each user's behavior class in accordance with each behavior pattern of the user's behavior class, and synthesizes the variations in load of the respective user's behavior classes.

The usage of the IT resources by the users cannot be regarded as a single event, but involves a variation in load having a series of spread over time. Such variation in load varies with behavior patterns of the users. Since the demand forecasting unit calculates a variation in load on the IT resources for each user's behavior class based on the behavior pattern of each user's behavior class, a variation in load in accordance with each behavior pattern of the user's behavior class can be obtained. Then, the variations in load of the respective user's behavior classes are synthesized, whereby a variation in load can be obtained with consideration given to behavior patterns of the users to use the IT resources.

Embodiment 1

The present embodiment relates to a demand forecasting system that forecasts a load on IT resources when a website is provided by the IT resources such as a Web server in a data center. This system performs the demand forecasting by forecasting the access numbers by users of the website.

FIG. 1 shows a configuration of a functional module in a demand forecasting system according to the present embodiment. A demand forecasting system 10 of the present embodiment includes: a log reading unit 1; a URL selection unit 2; an event attributable variation separation unit 3; a user's behavior model generation unit 4; an event characteristics model generation unit 5; a demand forecasting unit 6; a correction unit 7; and storage units 8a and 8b.

The log reading unit 1 reads a HyperText Transfer Protocol (HTTP) log of the website one by one. The HTTP log of a website is normally generated as a log file by a Web server providing the website. In this case, the log reading unit 1 reads the log file of the HTTP log generated by the Web server. Alternatively, the log reading unit 1 may directly acquire a HTTP log generated by the Web server.

Normally one website is composed of a plurality of services, and therefore a plurality of Uniform Resource Locators (URLs) are present for one website. The URL selection unit 2 selects a representative URL from the plurality of URLs on the website. The URL selected by the URL selection unit 2 will be utilized as an observation point URL by the user's behavior model generation unit 4 and the event characteristics model generation unit 5.

From the HTTP log read by the log reading unit 1, the event attributable variation separation unit 3 separates and extracts a section in which a transition in access number to the observation point URL shows an event attributable variation.

The user's behavior model generation unit 4 has a classification function of classifying users who access to the website into a plurality of user's behavior classes (hereinafter simply called classes) based on their behavior patterns. The classification is performed by analyzing the HTTP log extracted by the event attributable variation separation unit 3 and the HTTP log of the URL selected by the URL selection unit 2. The classified behavior patterns of the respective classes are stored as a user's behavior model in the storage unit 8a. Hereinafter the user's behavior model and the user's behavior model generation unit 4 are referred to as a user model and a user model generation unit 4, respectively.

The user model generation unit 4 further has a regular variation calculation function of calculating variations for each class in a regular usage state except for an event attributable variation. The variations in a regular usage state may include, for example, a seasonal variation, a weekly variation, a trend variation and the like of the usage state of the website. The calculated regular variations are associated with the respective classes so as to be included in the user model. That is to say, a user model includes classes and regular variations corresponding to the classes.

The event characteristics model generation unit 5 generates an event characteristics model based on the classes classified by the user model generation unit 4 and the HTTP log separated by the event attributable variation separation unit 3. The generated event characteristics model is stored in the storage unit 8a. Hereinafter the event characteristics model and the event characteristics model generation unit 5 are referred to as an event model and an event model generation unit 5, respectively.

The demand forecasting unit 6 generates demand forecasting data with consideration given to a variation due to an event, based on the event model and the user model obtained from the analysis of the HTTP log and a given event schedule data recorded in the storage unit 8b. The demand forecasting data contains a variation in load in the Web server, for example. The demand forecasting unit 6 has an event influence calculation function and a demand forecasting function. The event influence calculation function is a function of calculating predicted values of a variation over time in the access number for each class and the number of users moving among classes, caused by a scheduled event that will be held in the future. The demand forecasting function is a function of calculating a variation in load in the Web server based on the data calculated by the event influence calculation function.

The correction unit 7 collates in real time the predicted data on a variation in load, the access number and the like generated by the demand forecasting unit 6 with the HTTP log read by the log reading unit 1. Using the collating result, the correction unit 7 extracts an event model closer to the actual HTTP log and corrects the forecasting based on the extracted event model.

The demand forecasting system 10 may be configured on a computer such as a personal computer, a work station, a server or the like (hereinafter called PC). The functions of the log reading unit 1, the URL selection unit 2, the event attributable variation separation unit 3, the user model generation unit 4, the event model generation unit 5, the demand forecasting unit 6 and the correction unit 7 can be embodied by executing a predetermined program with a CPU of the computer.

As the storage units 8a and 8b, recording media such as semiconductor memory, RAM, ROM, hard disk (HD), Digital Versatile Disk (DVD) and the like can be used. The storage units 8a and 8b may be configured with one device or configured with the combination of a plurality of devices. As the storage units 8a and 8b, a recording medium such as a HD provided in the PC constituting the demand forecasting system 10 can be used, or a recording medium connected with the PC via a network can be used. Data used for processing performed by the demand forecasting system 10, data on a result of the processing or a result at some point during the processing and a program for making a computer execute processing to be performed by the demand forecasting system 10, etc. are recorded on the storage units 8a and 8b.

Further, a program for making a computer execute processing to be performed by the log reading unit 1, the URL selection unit 2, the event attributable variation separation unit 3, the user model generation unit 4, the event model generation unit 5, the demand forecasting unit 6 and the correction unit 7 may be downloaded from a recording medium such as CD-ROM or via a communication line and be installed in an arbitrary PC, whereby the demand forecasting system 10 can be configured.

The demand forecasting system 10 may be configured not only with one PC but also a plurality of PCs so as to allow the functions of the demand forecasting system 10 to be distributed to the plurality of PCs.

Figure 2:
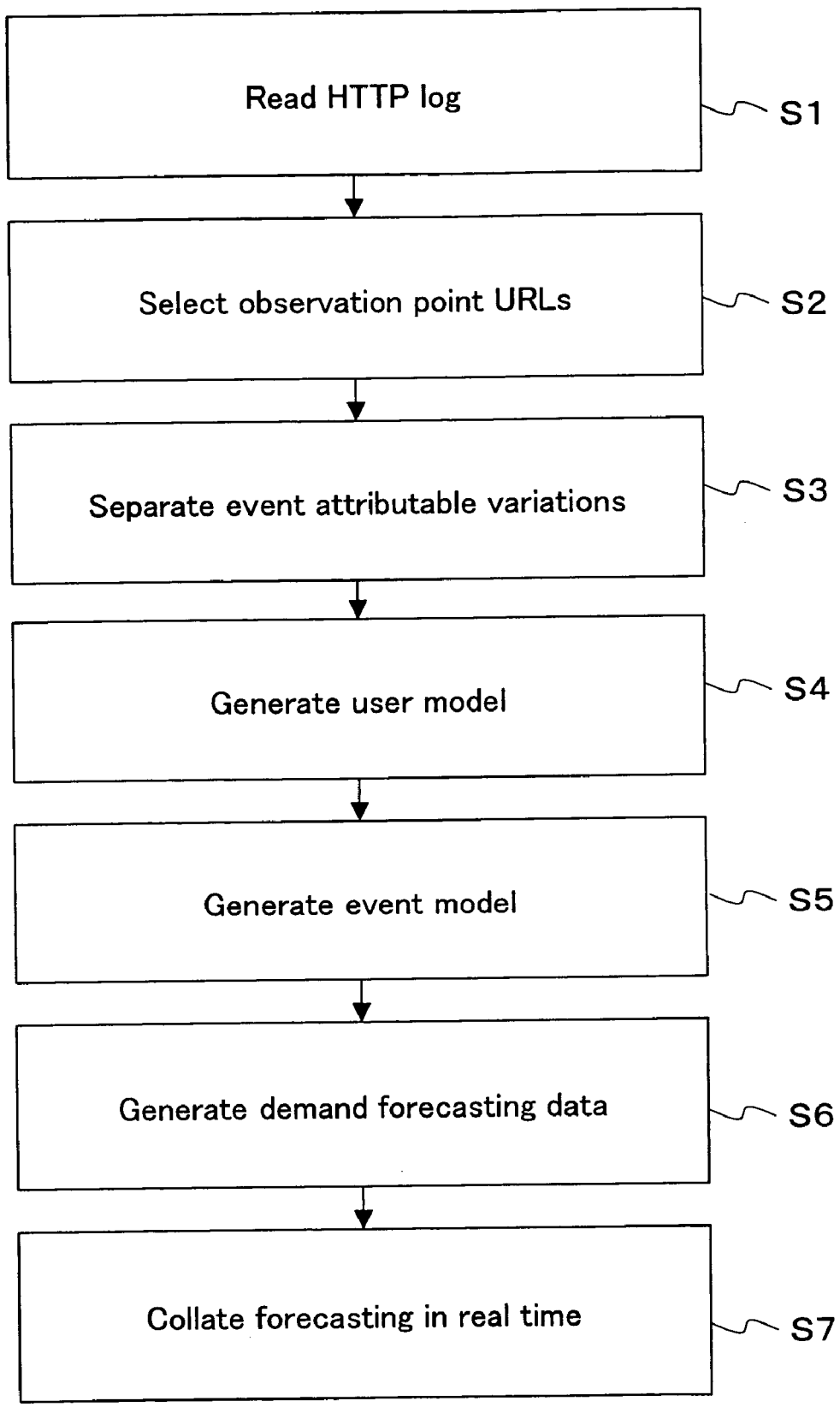
FIG. 2 is a flowchart showing an operation of the demand forecasting system.

The following describes an operation of the demand forecasting system 10, with reference to FIG. 1 and FIG. 2. FIG. 2 is a flowchart showing the operation of the demand forecasting system 10.

Firstly, the log reading unit 1 reads a HTTP log of the website one by one (Step S1). The HTTP log contains information such as an ID of a user who accesses to the website, its URL and the accessing time and the like. Note here that the information read by the log reading unit 1 is not limited to a HTTP log as long as it contains the above-stated information.

The URL selection unit 2 selects an observation point URL (Step S2). In the following user model generation processing (Step S4) and event model generation processing (Step S5), all of the URLs appearing in the HTTP log read by the log reading unit 1 are not analyzed. Instead, the URL selection unit 2 selects and defines a representative URL as the observation point URL for the website. Then, in the user model generation processing (Step S4) and the event model generation processing (Step S5), information in the HTTP log concerning the observation point URL will be analyzed.

The URL selection unit 2 selects a URL from the HTTP log in the past three months whose access number ranks in a higher level for a long time that can be considered a staple service, for example. The URL selection unit 2 further selects a distinctive URL, which is not the URLs for staple services, whose access number has increased sharply for a limited time period of the past such as one month or one week. Several higher-ranking URLs among the selected staple URLs and distinctive URLs are selected as an observation point URL group, which will be used in the following user model generation (Step S4) and event model generation (Step S5).

Note here that the processing of selecting observation point URLs (Step S2) may be omitted depending on the configuration of services of the site, so that all of the URLs may be analyzed. Further, the above-stated processing for selecting observation point URLs by the URL selection unit 2 is a non-limiting example, and other means may be used. Alternatively, a site administrator may give observation point URLs beforehand as initial data.

The event attributable variation separation unit 3 separates and extracts a section showing an event attributable variation from the HTTP log (Step S3). The section showing an event attributable variation is a section where a variation in amount of accesses to the website occurs due to an event, for example, a time section where accesses to the observation URL group increase sharply.

Figure 7D:
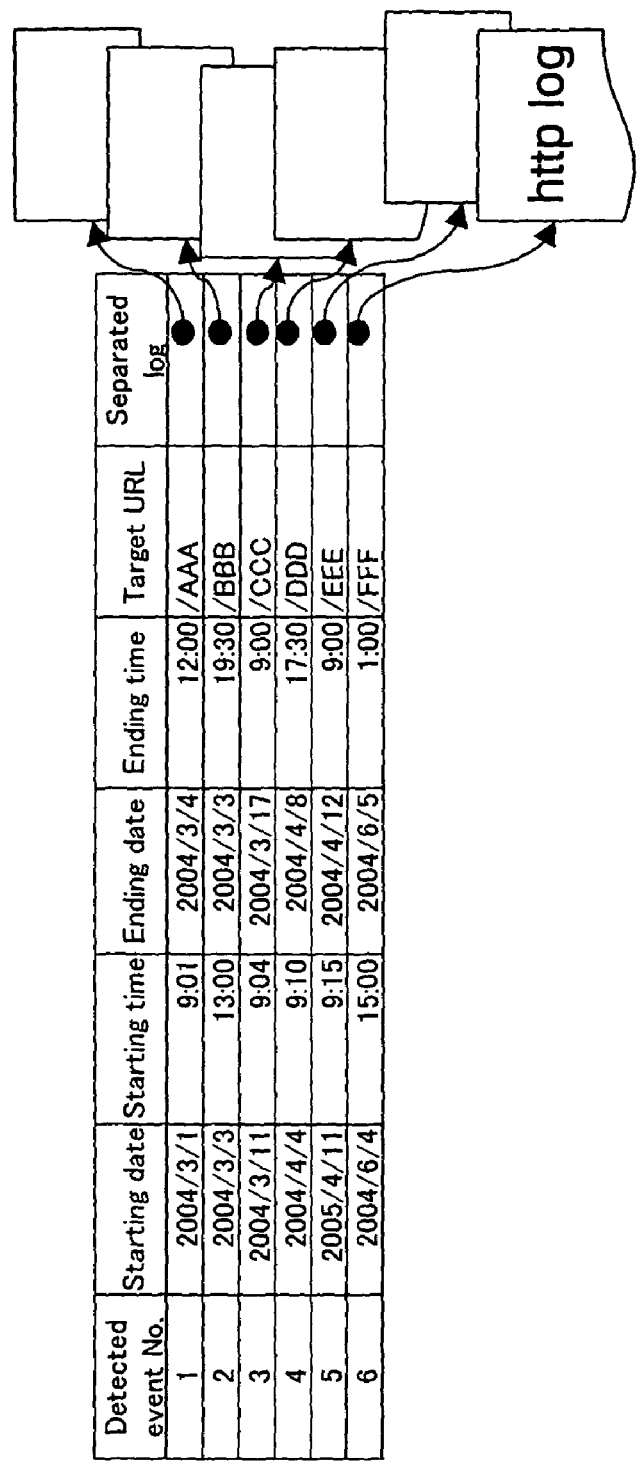
FIG. 7D shows an example of intermediate data showing an event attributable variation.

For instance, in the case where the access number in one day is found three times or more the average access number of the immediate seven days in the past HTTP log, the event attributable variation separation unit 3 puts marking on that day as a starting point of an event attributable variation. Further, with respect to a daily HTTP log obtained by reading one by one in units of hours, the event attributable variation separation unit 3 compares access numbers in the same time period during the recent seven days one another, and if there is found an increase by three times or more than the average access number, the event attributable variation separation unit 3 puts marking as a starting point of an event attributable variation. After putting the marking as the starting point, the event attributable variation separation unit 3 puts marking as an event ending point at a point in time, following the starting point, when a variation width decreases at twice, and separates and extracts a section from the starting point to the ending point as the event attributable variation. The event attributable variation separated and extracted by the event attributable variation separation unit 3 is stored in the storage unit 8a as intermediate data. FIG. 7D shows one example of the intermediate data showing an event attributable variation. The intermediate data shown in FIG. 7D is obtained by storing a starting date, a starting time, an ending date, an ending time, a target URL and a separated log for each event attributable variation separated and extracted. The separated log is a section of the HTTP log corresponding to the event attributable variation.

Note here that the above-stated processing for detecting an event attributable variation is a non-limiting example, and other detection means may be used. One example of the detection technique is described in Kenji YAMANISHI, Junichi TAKEUCHI, Yuko MARUYAMA, "Three Techniques for Statistical Detection of Abnormalities", published by Information Processing Society of Japan on Jan. 15, 2005, "Information Processing, the January issue in 2005", pp 34 to 40.

The user model generation unit 4 generates a user model (Step S4). The user model contains user's behavior classes and a seasonal variation, a trend variation and the like for each class, for example.

The user's behavior classes are generated by classifying users into a plurality of classes according to the behavior patterns of the respective users on the website based on the HTTP log. The user model generation unit 4 represents the user's behavior patterns with two axes of a response time from the occurrence of the past event to the visit to the website and a usage frequency concerning the respective pages configuring the website, so as to classify the behavior patterns into the plurality of classes.

More specifically, the user model generation unit 4 firstly classifies the response times of the respective users into five levels, where this classification is performed for each of the event attributable variations extracted at Step S3. Then, the user model generation unit 4 stores the classification result as a matrix of "users, events and response time levels". Further, the user model generation unit 4 classifies the usage frequencies of the respective users at the observation point URLs into five levels based on the HTTP log and stores the result as a matrix of "users, observation point URLs and usage frequency levels".

Clustering of vectors for the respective users is performed with respect to the synthesized matrix of the above matrixes concerning usage frequency and response time, whereby the users are classified into the plurality of classes. The clustering of vectors for the respective users can be performed using an already-existing technique such as K-Means clustering technique. The classified classes are stored in the storage unit 8a as a user model.

The user model generation unit 4 further generates a seasonal variation and a trend variation in access number for each class and stores the same as the user model. The user model generation unit 4 divides the HTTP log into the respective classes and extracts a seasonal variation and a trend variation in access number therefrom. The extraction of the seasonal variation and the trend variation for each class can be performed using any already-existing techniques such as TCSI separation technique and ARIMA technique.

The detailed processing at the user model generation (Step S4) will be described later.

The event model generation unit 5 generates an event model (Step S5). The event model contains information showing a time distribution of accesses by the respective classes in response to a certain event in the past and the number of users moving among classes after the occurrence of the event.

For the event model generation, the event model generation unit 5 collates the HTTP log that represents the event attributable variation separated at Step S3 with the user model generated at Step S4. As a result of the collating, a transition pattern over time of a class distribution ratio can be extracted representing the percentages of the accesses performed by the respective classes at certain time periods during the event attributable variation.

Further, the event model generation unit 5 compares classes generated before the starting of the event attributable variation with classes generated after the ending of the event attributable variation so as to calculate the number of users moving among classes before and after the event.

The demand forecasting unit 6 generates demand forecasting data (Step S6). That is, the demand forecasting unit 6 forecasts a variation in access number to the website for each class based on the user model, the event model and the scheduled event data. Based on these access numbers, the demand forecasting unit 6 forecasts a variation in load on the IT resources for each class. The variation in load for each class is synthesized so as to forecast a final load variation.

More specifically, the demand forecasting unit 6 selects an event model representing a case having the closest resemblance to the event scheduled among examples of the events occurring in the past. Based on the selected event model, a transition in access number due to the event scheduled and a transition in number of users moving among classes after the ending of the event scheduled are forecasted. The demand forecasting unit 6 adds the transition in access number and the transition in number of users moving among classes due to the event scheduled, i.e., influences of the event, to a variation pattern defined for each class such as a seasonal variation and a trend variation in access number. In this way, the access number for each class can be forecasted.

Using the access number forecasted for each class, the demand forecasting unit 6 forecasts a variation in load for each class by means of an already-existing technique such as Queuing Network. The thus generated variation in load for each class is synthesized so as to determine a final variation in load. This synthesized variation in load can be a final demand forecasting data.

The detailed processing at the demand forecasting data generation (Step S6) will be described later.

The correction unit 7 collates the forecasted variation in load and the access number with the HTTP log after the occurrence of the event scheduled in real time, thus searching for an event model closer to the real HTTP log again so as to correct the forecasting (Step S7). With the above-stated processing, the demand forecasting system 10 can forecast demands for the IT resources in the data center accurately.

The following describes the detailed processing of Steps S4 to S7, respectively.

Firstly, the detailed processing of the user model generation (Step S4) will be described. As stated above, the user model generation (Step S4) is performed after the extraction of observation point URLs (Step S2) and the separation of event attributable variations (Step S3).

Figure 3:
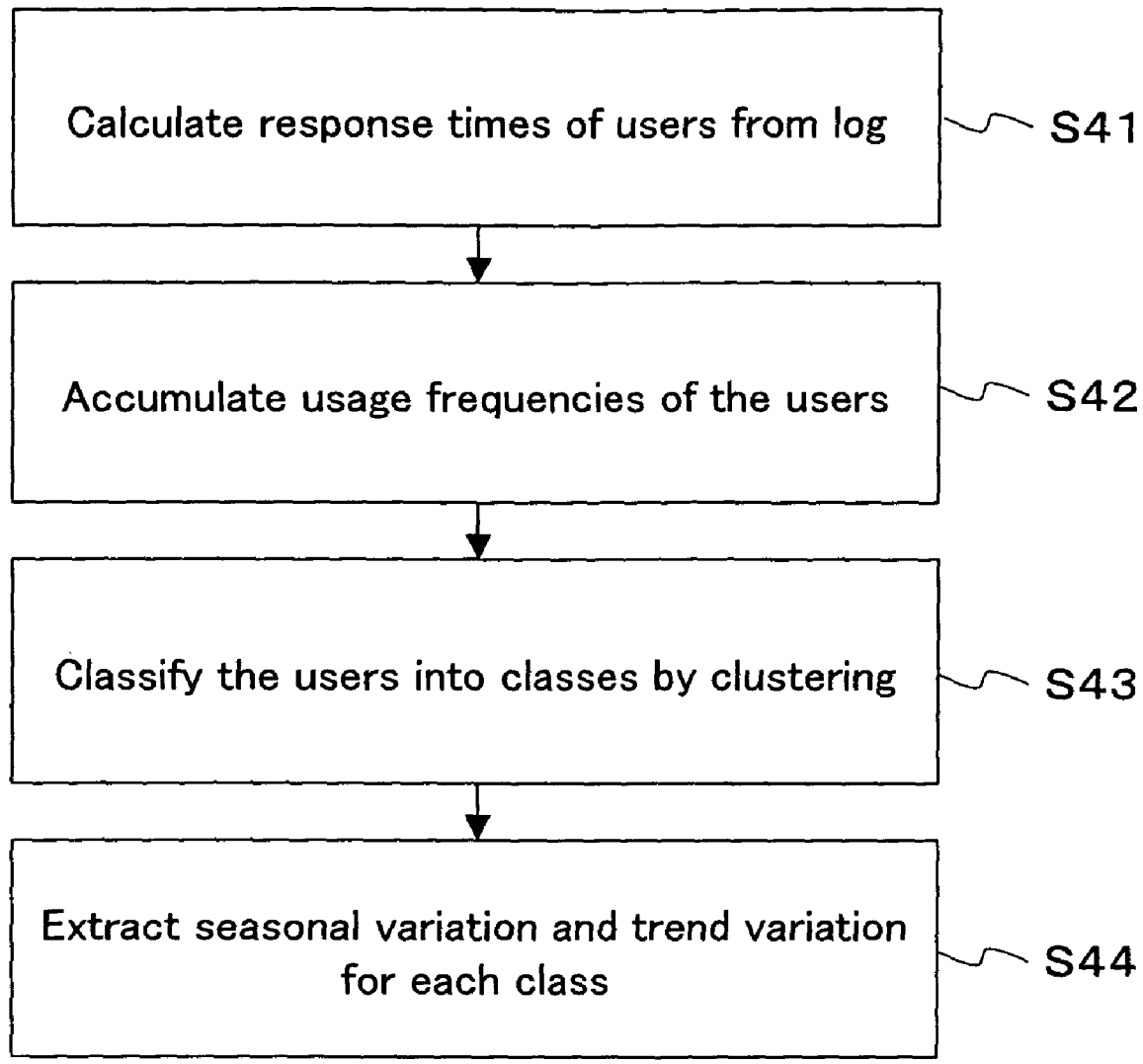
FIG. 3 is a flowchart showing the detailed processing of the user behavior model generation.

FIG. 3 is a flowchart showing the detailed processing of the user model generation.

Firstly, the user model generation unit 4 calculates a response time by each user based on the HTTP log (Step S41). The response time is for example a time between the occurrence of an event and the access by the user to the website. Response times by the respective users can be classified into five levels, for example. As a method for the classification into five levels, for example, the response times may be classified into levels with their classification boundaries at 10 minutes, 1 hour, 12 hours and 2 days elapsed from the starting of the event, to which levels "1" to "5" are assigned, respectively, in this order. The level "5" can include users who do not access. The thus classified levels of the response times are associated with the users and the events and are stored as a matrix. FIG. 4A shows an example of the matrix that stores associated "users, events and response time levels".

Next, the user model generation unit 4 accumulates usage frequencies of the respective users at the observation point URLs from the HTTP log (Step S42). The usage frequency can be represented for example in units of access number per one week (access number/week). The usage frequencies are classified into five levels, for example. As a method for the classification into five levels, for example, the usage frequencies can be classified into levels of: once or more per day; three times or more per week; once or more per week; twice or more per month; and less than twice per month, to which levels "1" to "5" can be assigned in this order, respectively. The classified levels of the usage frequencies are associated with the users and the observation point URLs and are stored as a matrix. FIG. 4B shows an example of the matrix that stores associated "users, observation point URLs and usage frequency levels".

Using the above response times and usage frequencies, the user model generation unit 4 classifies users into a plurality of user's behavior classes (Step S43). The user model generation unit 4 classifies the user into classes by performing clustering of vectors of the response times and the usage frequencies, for example. More specifically, the clustering of vectors for the respective users can be performed with respect to the synthesized matrix of the matrixes concerning the response times and the usage frequencies using an already-existing technique such as K-Means clustering technique. As a result of this clustering, the users can be classified into a plurality of classes. FIG. 4C shows a result of the synthesized matrix of the matrixes shown in FIG. 4A and FIG. 4B with classes assigned thereto. In the example of FIG. 4C, the synthesized matrix of matrixes of FIG. 4A and FIG. 4B is a matrix with each column consisting of eight-item vectors. As a result of the clustering with respect to this matrix, classes are assigned to the respective columns. The thus generated classes are stored as a user model in the storage unit 8a.

In the present embodiment, although nonhierarchical K-Means technique is used as the clustering technique, other hierarchical clustering techniques may be used. Further, the initial value that is required for the K-Means technique may be a randomly-generated value, or may be a result of the classification by other hierarchical clustering techniques for assigning the initial value.

After the accumulation of the classes, the user model generation unit 4 extracts regular variations such as a seasonal variation, a weekly variation and a trend variation for each class from the HTTP log (Step S44). For instance, regular variations concerning members constituting each class, the number of the users and the access number, etc. are extracted.

The extracted variations are associated with the classes so that they can be involved in the user model, which are stored in the storage unit 8*a*.

As a technique for the extraction of regular variations such as a seasonal variation, a weekly variation and a trend variation for each class, TCSI separation technique, ARIMA technique or the like can be used, for example.

FIG. 5 shows an example of regular variations that are extracted by TCSI separation technique and are involved in a user model to be stored. In the example FIG. 5, a trend variation and a seasonal variation per month, a weekly variation and a variation per hour are extracted using TCSI separation technique to be stored. A trend in more recent twelve months and seasonal fluctuation coefficients, fluctuation coefficients during a week (weekly fluctuation coefficients) and fluctuation coefficients per hour are stored for each class. The thus stored tendencies of variations are used for the forecasting.

Next, the detailed processing of the event model generation (Step S5, see FIG. 2) will be described. As shown in FIG. 2, the event model generation is performed after the extraction of observation point URLs (Step S2), the separation of event attributable variations (Step S3) and the user model generation (Step S4).

Figure 6:
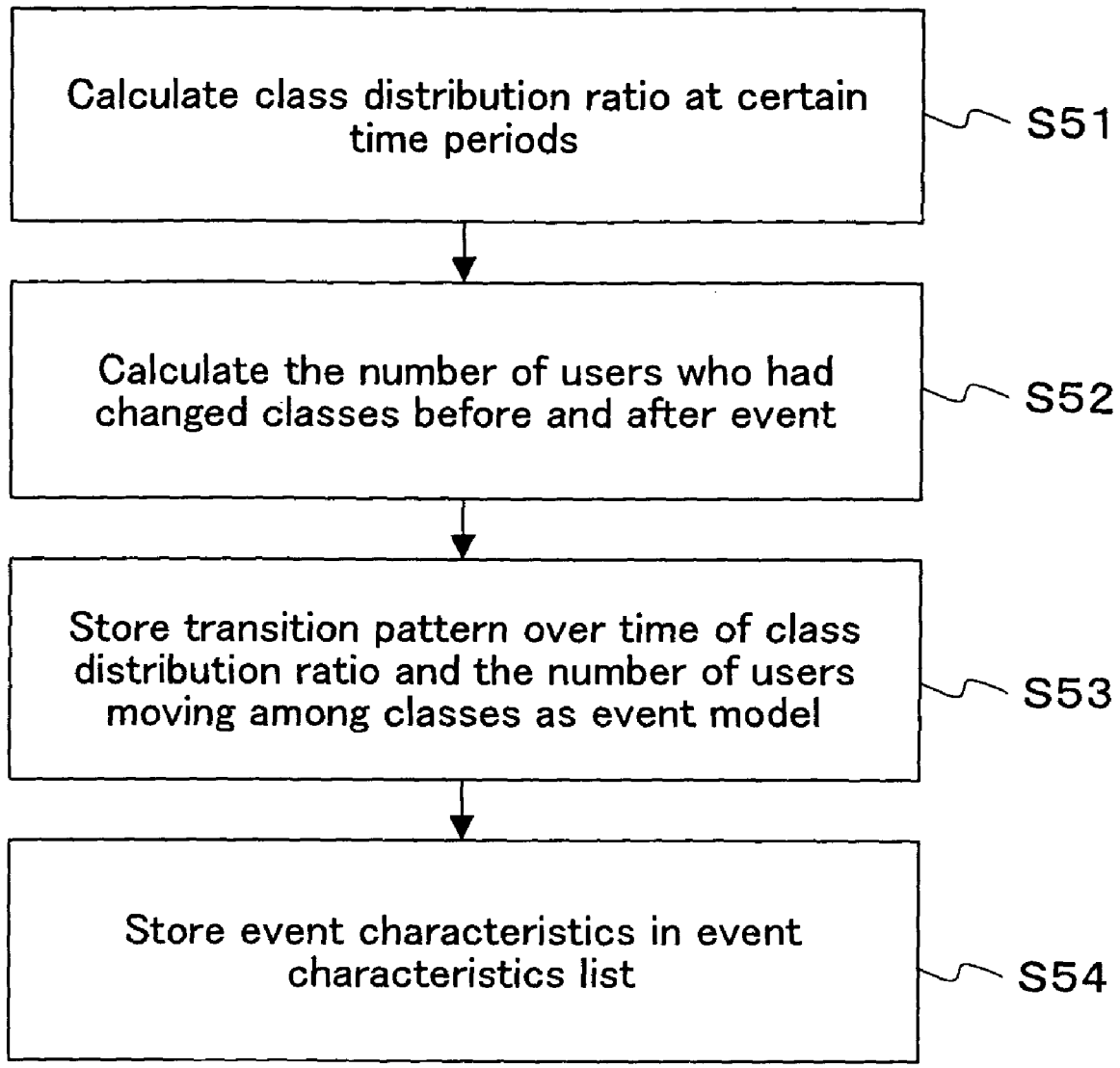
FIG. 6 is a flowchart showing the detailed processing of the event characteristics model generation.

FIG. 6 is a flowchart showing the detailed processing of the event model generation.

Firstly, the event model generation unit 5 calculates a class distribution ratio during certain time periods of an event attributable variation (Step S51). The event attributable variation can be represented with a time-series waveform of the number of accesses to the observation point URLs. When this time-series waveform is segmented into a plurality of time periods, users who access during the respective time periods belong to various classes. A ratio of the number of users belonging to the respective classes during a certain time period to the total number of users during that time period is defined as a class distribution ratio.

The following describes an example of a method for calculating the class distribution ratio. At Step S51, firstly, intermediate data that associates the response times by the respective users with the classes of the respective users is generated based on the HTTP log extracted as an event attributable variation. FIG. 7A shows an example of the intermediate data in which elapsed times from the occurrence of the event to the accesses by the respective users and the classes of the respective users are associated with each other.

Based on such intermediate data, a matrix is generated representing how many accesses are made by each class during a plurality of time periods, for example, of a first 10 minutes, 20 minutes, 1 hour and 12 hours. FIG. 7B shows an example of the matrix representing a class distribution ratio of access numbers during the respective time periods after the occurrence of an event. In the matrix of FIG. 7B, a transition pattern over time for the respective classes during the event attributable variation is shown. Such a matrix is included in the event model as a transition pattern over time for the respective classes so as to be stored in the storage unit 8*a*.

Note here that although the matrix of FIG. 7B shows a transition pattern over time of the class distribution ratio, a matrix showing a transition pattern over time of the access numbers for the respective classes can be generated as well.

With respect to the event with its event attributable variation finished, the event model generation unit 5 calculates the number of users who have changed classes they belonged before and after the event (Step S52). The number of the users who have changed classes can be calculated for example by comparing the classes generated before the starting of the event attributable variation with the classes generated after the ending of the event attributable variation. FIG. 7C shows an example of data showing a change in the number of users who belong to the respective classes at a time when one week has elapsed from the ending of the event relative to the number of users who belong to the respective classes before the starting of the event. The data of FIG. 7C represents the moving of users among classes.

The event model generation unit 5 associates the transition pattern over time of the respective classes shown in FIG. 7B as one example with the users' moving among classes shown in FIG. 7C as one example and stores the same as the event model (Step S53). For one event, a transition pattern over time of the respective classes and a users' moving among classes are stored as an event model of the event. Normally, a plurality of events are extracted as event attributable variations from a HTTP log, and therefore with respect to each of the plurality of events, a transition pattern over time of the respective classes and a users' moving among classes are stored as the event model.

Reaction patterns for an event normally vary from one class to another. For example, in response to a certain event, some user groups react soon and other user groups react after confirming others' trends by word of mouth or the like. In the present embodiment, variations due to events in the past are represented with a matrix having a vertical axis and a horizontal axis showing time and class distribution, respectively, as shown in FIG. 7B. The thus characterized events are stored as event models in the storage unit 8*a*. Based on such event models, if a similar event occurs, demands can be forecasted with consideration given to user groups that may react in various different ways.

Further, as shown in the example of FIG. 7C, events can be characterized by users' moving among classes. Thereby, a variation in load can be forecasted with consideration given to the case where "an occasional user" turns into "a heavy user" because of a promotion.

By the way, an event may have various forms depending on its purpose, the timing, the method and the like. As examples of information indicating the forms and the contents of an event, event characteristics are available. The event characteristics are information indicating the forms and the contents of an event, such as "scheduled time of the event, target URLs, a type of the event, the scale of the event (e.g., expected number of reaching the advertisements (reach number)), intended number of visitors, view-through rate (a ratio of persons responding finally to receivers of the advertisements), intended repeating rate, the presence or not of deadline, targeted user group". Such information indicating the forms and the contents of the event cannot be obtained from a HTTP log.

Meanwhile, a business provider or the like planning an event generates an event that is scheduled to be held in the future as event scheduled data, and stores the same in the storage unit 8*b*. Normally, the event scheduled data stored by the business provider contains the above-stated event characteristics such as "scheduled time of the event, target URLs, a type of the event, the scale of the event (e.g., expected reach number of the advertisements), intended number of visitors, view-through rate (a ratio of persons responding finally to receivers of the advertisements), intended repeating rate, the presence or not of deadline, targeted user group". The event scheduled data stored in the storage unit 8*b* is stored even after the ending of the event.

FIG. 8 shows an example of a screen on which a business provider can set such event scheduled data. The business provider selects on the screen as to when the respective types of events will be held. Further, the business provider describes the forms and the contents of the events on a pop-up window 9 within the event types.

The event model generation unit 5 collates the event scheduled data stored by the business provider with the event with an event model generated therefor, and stores event characteristics of the matching event scheduled data in an event characteristics list (Step S54).

The event model generation unit 5 collates "scheduled time of the event" and "target URLs" included in the event scheduled data stored in the storage unit 8*b* with the event attributable variations separated by the event attributable variation separation unit 3.

More specifically, for example, "starting date and starting time" and "target URL" of the event attributable variations shown in FIG. 7D are compared with "scheduled time of the event" and "target URLs" included in the event scheduled data. If both of the "target URLs" agree with each other, and "starting date and starting time" and "scheduled time of the event" agree with each other or are dose to each other, it is judged that the event having the event attributable variations that are the target of the comparison and the event indicated by the event scheduled data are the same or similar. The event model generation unit 5 stores in the event characteristics list the event characteristics described in the event scheduled data as event characteristics of the event that is the same as or similar to the scheduled event. That is, if there is an event described in the event scheduled data that is the same as or similar to the events represented with the event models generated by the event model generation unit 5, then the event model generation unit 5 copies the event characteristics described by the business provider such as a medium, a starting time and an expected reach number, and stores the same in the event characteristics list.

FIG. 9 shows an example of the stored event characteristics list. For events on the second and the sixth columns, there is no corresponding event scheduled data found.

In this way, the event model generation unit 5 collates "scheduled time of the event" and "target URLs" described in a given event scheduled data with "starting date and starting time" and "target URL" of the event attributable variations, and if both of the "target URLs" agree with each other, and "starting date and starting time" and "scheduled time of the event" agree with each other or are dose to each other, then the event model generation unit 5 extract such an event. Then, for the thus extracted event, the event characteristics described in the event scheduled data are stored in the event characteristics list.

Every time the starting/ending of new event attributable variations is detected, the event model generation unit 5 adds a new event model.

Next, the detailed processing of the demand forecasting data generation (Step S6, see FIG. 2) will be described. As shown in FIG. 2, the demand forecasting data generation is performed after the user model generation (Step S4) and the event model generation (Step S5). That is, the demand forecasting data generation processing is performed based on the following preconditions: assigned classes and regular variations for each class have been stored as a user model; a transition pattern over time of a class distribution ratio and the number of users moving among classes have been stored as an event model; and a business provider has already defined schedules of an event as event scheduled data.

Figure 10:
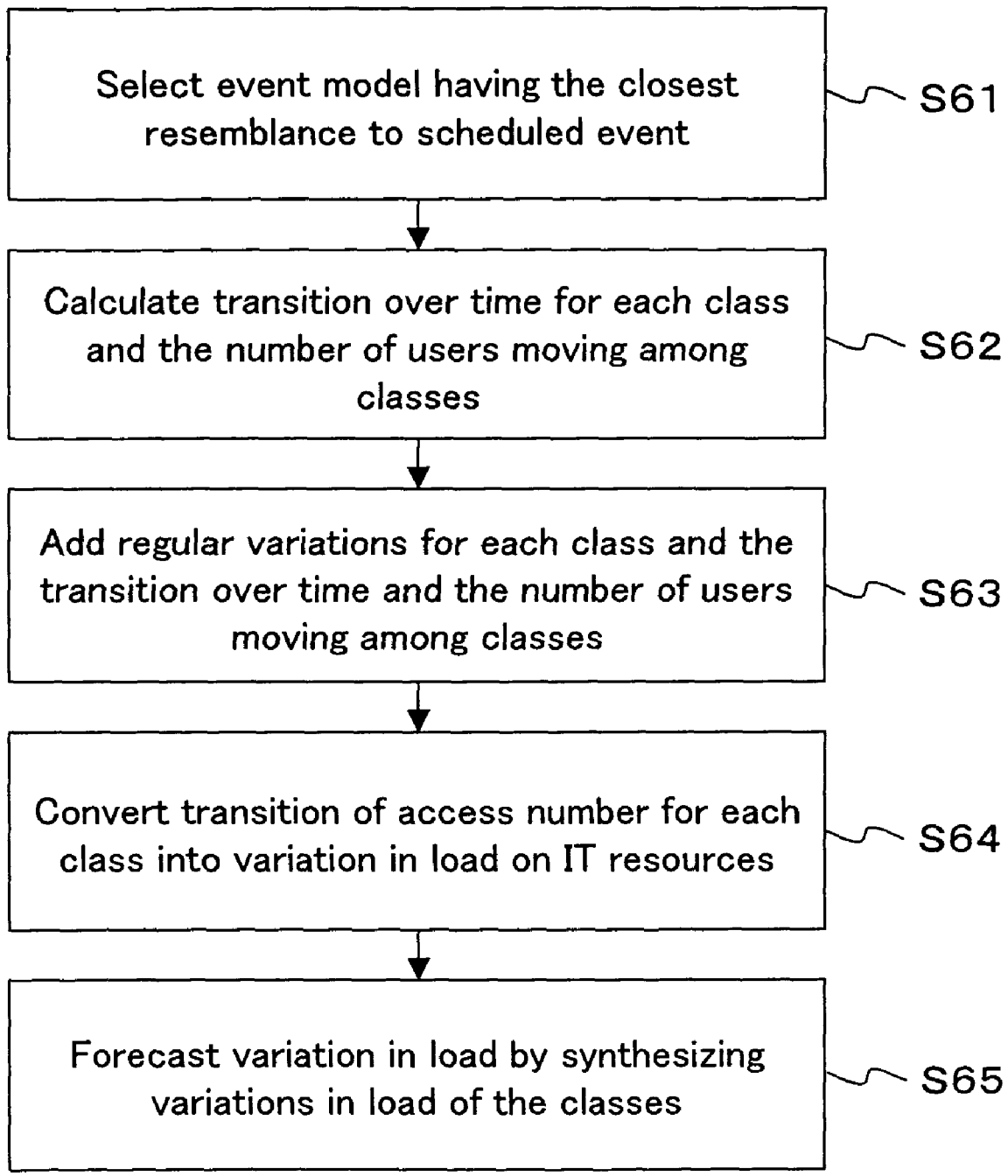
FIG. 10 is a flowchart showing the detailed processing of the demand forecasting data generation.

FIG. 10 is a flowchart showing the detailed processing of the demand forecasting data generation.

Firstly, the demand forecasting unit 6 collates event characteristics of an event scheduled by the business provider such as "medium, the event scale, intended number of visitors, intended view-through rate, intended repeating rate, presence or not of deadline, targeted user group" with the event characteristics described in the event characteristics list stored by the event model generation unit 5 so as to select an event model having the closest resemblance (Step S61).

The following describes one example of a method for selecting an event model having a closer resemblance. Firstly, the demand forecasting unit 6 gives "medium, targeted user group and presence or not of deadline" the highest priority for the extraction and extracts event models matching with the scheduled event in these characteristics so as to narrow the options. Among the thus extracted event models, the demand forecasting unit 6 further selects patterns closer in reach number and intended number of visitors (or intended view-through rate).

Herein, descriptions of the event characteristics such as the types of medium, the reach number, the presence or not of deadline and the intended repeating rate do not depend on the individual websites. Therefore, in the case where demand forecasting is performed for a new website A with no data in the past available, the demand forecasting unit 6 can search for event models having similarities in medium, reach number, presence or not of deadline, intended repeating rate and the like from the event models for a different website B. The event models extracted by the searching can be used for the forecasting of a demand variation pattern caused by the scheduled event.

Next, using the selected event models, the demand forecasting unit 6 calculates a predicted value of a transition pattern over time for each class due to the scheduled event and a predicted value of the number of users moving among classes due to the scheduled event (Step S62).

The transition pattern over time for each class due to the scheduled event is represented with a transition pattern over time of the access numbers of each class after the occurrence of the scheduled event. The transition pattern over time of the access number after the occurrence of the scheduled event is calculated based on the transition pattern over time for each class (see FIG. 7B) included in the event model selected at Step S61. If the access number calculated from the event model is different from the intended number of visitors of the scheduled event (or reach number×the intended view-through rate), a certain multiplier N can be multiplied to the access number to obtain a predicted value so that it can agree or can be close to the intended number of visitors. For instance, when a transition pattern over time of the access number in the past, i.e., a demand variation waveform in the past is multiplied by N, a transition pattern over time can be generated so as to correspond to the expected access number.

The number of users moving among classes due to the scheduled event is calculated based on the number of users moving among classes included in the event model selected at Step S61 (see FIG. 7C).

The demand forecasting unit 6 adds regular variations defined for each class, such as a seasonal variation, a weekly variation and a fluctuation trend, and the transition pattern over time of the access number for each class determined at Step S62. With respect to this added result, the demand forecasting unit 6 further adds the number of users moving among classes (Step S63). Note here that the regular variations that are to be added are the regular variations included in the event model selected at Step S61 (see FIG. 5).

That is, a variation in the number of users in the respective classes due to the moving by the users among classes is further added to variations for the respective classes in which a transition pattern over time of the access number due to the scheduled event and regular variations are added. As a result, the transition of the access number can be determined for each class with consideration given to regular variations of the access number, a variation in access number due to the scheduled event and moving by users among classes due to the scheduled event.

The demand forecasting unit 6 converts the transition of the access number determined at Step S63 into a variation in load on IT resources (Step S64).

Since the transition of the access number is determined for each class, the conversion from the transition of the access number to the variation in load is performed for each class. Therefore, the conversion can be performed according to the behavior pattern for each class so as to correspond to the behavior pattern. For instance, in the case where the majority of users in one class browse only during one access whereas the majority of users in another class browse while downloading, loads applied on IT resources during one access vary from one class to another. In such a case, if the transition of the access number can be converted into a variation in load according to the behavior pattern of each class, a variation in load closer to the actual one can be obtained.

As a technique for converting the transition of the access number to the variation in load on IT resources, an already-existing technique such as Queuing Networks can be used.

The demand forecasting unit 6 synthesizes the variations in load determined for the respective classes so as to forecast a variation in load after the occurrence of the scheduled event (Step S65).

As stated above, a plurality of classes are used for demand forecasting, whereby a difference in peaks resulting from a difference in response times of classes from the occurrence of an event can be forecasted. That is, it is possible to forecast accurately a point in time when a load on IT resources becomes the maximum after the occurrence of the event. Further, the use of the event model including moving by users among classes due to the event allows an increase in load on the IT resources or an increase in demand caused by the fixing of users because of an event such as a promotion, for example, to be forecasted.

Next, the detailed processing of the real-time forecasting collating (Step S7, see FIG. 2) will be described. After the scheduled event that is a target of the forecasting at the demand forecasting data generation (Step S6) occurs actually, the real-time forecasting collating is performed based on operation data after the occurrence of the scheduled event such as a HTTP log.

Figure 11:
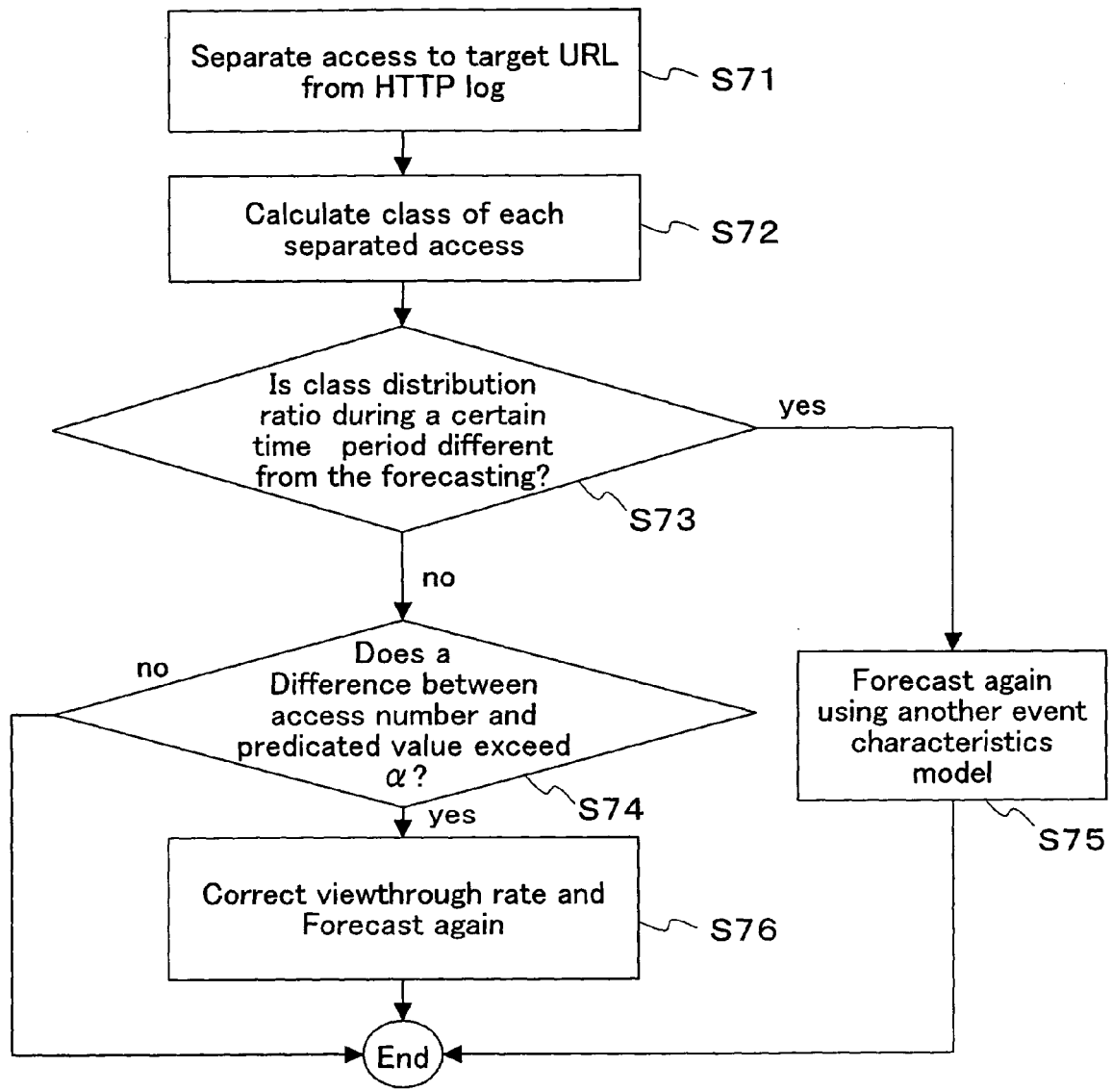
FIG. 11 is a flowchart showing the detailed processing of the real-time forecasting collating.

FIG. 11 is a flowchart showing the detailed processing of the real-time forecasting collating.

After the scheduled event occurs actually, the log reading unit 1 acquires HTTP log data one by one. The log reading unit 1 separates from the acquired HTTP log an access history of URLs that are the target of the scheduled event (Step S71). The separated access history is passed to the correction unit 7.

The correction unit 7 determines classes of the users that are included in the separated access history (Step S72). The classes can be determined for example by referring to the user model based on users' IDs described in the HTTP log. By determining the classes of the users who accessed, the correction unit 7 calculates a class distribution ratio concerning accesses during predetermined time periods such as 10 minutes and 1 hour after the starting of the event.

A distance between the calculated class distribution ratio during the time periods and the class distribution ratio during those time periods included in the event model used for the forecasting is calculated (Step S73).

If the distance is a certain value or more (yes at Step S73), searching for event model is performed again so as to extract an event model having a closer resemblance. Using the extracted event model, a predicted value is generated again (Step S75). The judgment regarding resemblance in the above searching can be performed in a similar manner to Step S73 by comparing the class distribution ratio calculated from the HTTP log with the class distribution ratio of the event model. An event model having a smallest distance between the class distribution ratio calculated from the HTTP log and the class distribution ratio of the event model can be defined as a model having the closest resemblance.

If there is no difference between the class distribution ratio calculated from the HTTP log and the class distribution ratio of the event model used for the forecasting (no at Step S73), comparison regarding an absolute value of a difference between the actual access number and the forecasted access number is performed (Step S74). For instance, it is judged whether the absolute value of a difference between the actual access number and the forecasted access number is a predetermined threshold $\alpha$ or more.

If the absolute value of a difference in access number is the threshold $\alpha$ or more (yes at Step S74), the view-through rate or the like used for the forecasting is corrected so as to correspond to the actual value and forecasting is performed again (Step S76).

That is, even in the case of yes at Step S74, there is a possibility that the forecasting concerning the intended number of visitors (or reach number×view-through rate) used in the demand forecasting data generation process (Step S6 of FIG. 2) is different from the actual access number. For instance, in the demand forecasting data generation processing, in order to make the expected access number closer to the intended number of visitors, a multiplier N=2.1 is multiplied to the event attributable variation in the past used for the base of the forecasting. In such a case, however, the HTTP log for 10 minutes after the starting the event may have only the amount of the multiplier N=1.5. In this case, the multiplier N can be corrected so as to correspond to the actual value, and forecasting may be performed again.

In this way, the correction unit 7 collates the log information after the event occurring actually with the event model in real time, whereby an event model closer to the actual influence of the event is selected again. The newly selected event model is utilized in the following forecasting. That is, when operation data immediately after the occurrence of the event can be acquired, the correction unit 7 measures a distance between the class distribution in the operation data and data in the event model used for the forecasting. If the measured distance exceeds a predetermined value, the correction unit 7 can select data closer to the actual one than the originally employed event model from a plurality of event models, so as to correct the forecasting.

As stated above, according to the present embodiment, a load can be forecasted more accurately than in conventional technologies. As a result of the accurate load forecasting, a resource placement plan and a promotion plan for customers can be made appropriately in a data center.

Then, in a data center, especially in a utility-type data center capable of increasing and decreasing IT resources allocated to each customer in an on-demand manner, utilization efficiencies of IT resources can be optimized based on the demand forecasting.

The demand forecasting system according to the present invention is effective because it enables the optimization of the utilization efficiencies of IT resources by forecasting demands for the IT resources in a data center accurately.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A demand forecasting computer system, comprising:
   a classification unit that classifies a plurality of users who use IT resources in a data center into a plurality of user's behavior classes based on behavior patterns of the users to use the IT resources;
   an event characteristics model generation unit that calculates, using a computer processor, a variation over time in a usage state of the IT resources with respect to each user's behavior class based on the user's behavior classes and a log data generated at a time of a past event, calculates the number of the users moving among the user's behavior classes caused by the event by comparing classes generated before the starting of the event with classes generated after the ending of the event, and generates an event characteristics model representing the variation over time in a usage state of the IT resources with respect to each user's behavior and the number of users moving among the user's behaviour classes caused by the event;
   an event influence calculation unit that calculates a predicted value of the variation over time in a usage state of the IT resources for each user's behavior class and a predicted value of the number of the users moving among the user's behavior classes that will be caused by an event scheduled to be held in the future using the event characteristics model; and
   a demand forecasting unit that calculates a variation in load on the IT resources based on the predicted values of the variation over time and the number of the users moving that are calculated by the event influence calculation unit.

2. The demand forecasting computer system according to claim 1, wherein the classification unit classifies the users into the plurality of user's behavior classes based on the behavior patterns of the users represented with a time between occurrence of the event and starting of usage of the IT resources by the users and frequencies of the users using the IT resources.

3. The demand forecasting computer system according to claim 1, further comprising a regular variation calculation unit that calculates a regular variation in a usage state of the IT resources for each user's behavior class except for event attributable variations, wherein the demand forecasting unit calculates the variation in load based on the variation calculated by the regular variation calculation unit and the predicted values of the variation over time and the number of the users moving calculated by the event influence calculation unit.

4. The demand forecasting computer system according to claim 1, wherein the event characteristics model generation unit generates a plurality of event characteristics models, the event influence calculation unit calculates the predicted values of the variation over time and the number of the users moving using one of the plurality of event characteristics models, and the demand forecasting system further comprises a correction unit that collates an initial usage record after the occurrence of the scheduled event with the plurality of event characteristics models and corrects the predicted values of the variation over time and the number of the users moving calculated by the event influence calculation unit using an event characteristics model that is judged by the collating to have the closest resemblance to the usage record.

5. The demand forecasting computer system according to claim 1, wherein the demand forecasting unit calculates a variation in load on the IT resources for each user's behavior class in accordance with each behavior pattern of the user's behavior class, and synthesizes the variations in load of the respective user's behavior classes.

6. A demand forecasting method that forecasts demands for IT resources in a data center using a computer that is accessible to usage recording data on which usage of the IT resources by a plurality of users is recorded, the method comprising the steps of:
   a classification step in which a classification unit included in the computer classifies, based on the usage recording data, the plurality of users who use the IT resources in the data center into a plurality of user's behavior classes according to behavior patterns of the users to use the IT resources;
   an event characteristics model generation step in which an event characteristics model generation unit included in the computer calculates, using a computer processor, a variation over time in a usage state of the IT resources with respect to each user's behavior class based on the user's behavior classes and a log data generated at a time of a past event, calculates the number of the users moving among the user's behavior classes caused by the event by comparing classes generated before the starting of the event with classes generated after the ending of the event, and generates an event characteristics model representing the variation over time in a usage state of the IT resources with respect to each user's behavior and the number of users moving among the user's behaviour classes caused by the event;
   an event influence calculation step in which an event influence calculation unit included in the computer calculates a predicted value of the variation over time in a usage state of the IT resources for each user's behavior class and a predicted value of the number of the users moving among the user's behavior classes that will be caused by an event scheduled to be held in the future using the event characteristics model; and
   a demand forecasting step in which a demand forecasting unit included in the computer calculates a variation in load on the IT resources based on the predicted values of the variation over time and the number of the users moving that are calculated at the event influence calculation step.

7. A computer program product stored in a non-transitory computer readable medium containing a demand forecasting program for execution by a computer, which when executed by the computer, causes the computer to perform the processes of:
   a classification process that classifies a plurality of users who use IT resources in a data center into a plurality of user's behavior classes based on behavior patterns of the users to use the IT resources;
   an event characteristics model generation process that calculates a variation over time in a usage state of the IT resources with respect to each user's behavior class based on the user's behavior classes and a log data generated at a time of a past event, calculates the number of the users moving among the user's behavior classes caused by the event by comparing classes generated before the starting of the event with classes generated after the ending of the event, and generates an event characteristics model representing the variation over time in a usage state of the IT resources with respect to each user's behavior and the number of users moving among the user's behavior classes caused by the event;

an event influence calculation process that calculates a predicted value of the variation over time in usage of the IT resources for each user's behavior class and a predicted value of the number of the users moving among the user's behavior classes that will be caused by an event scheduled to be held in the future using the event characteristics model; and a demand forecasting process that calculates a variation in load on the IT resources based on the predicted values of the variation over time and the number of the users moving that are calculated by the event influence calculation process.

* * * * *